April 15, 1969   W. C. YOCUM   3,438,391
CHECK VALVES HAVING PLASTIC SEALING MEMBER
Filed Jan. 13, 1964
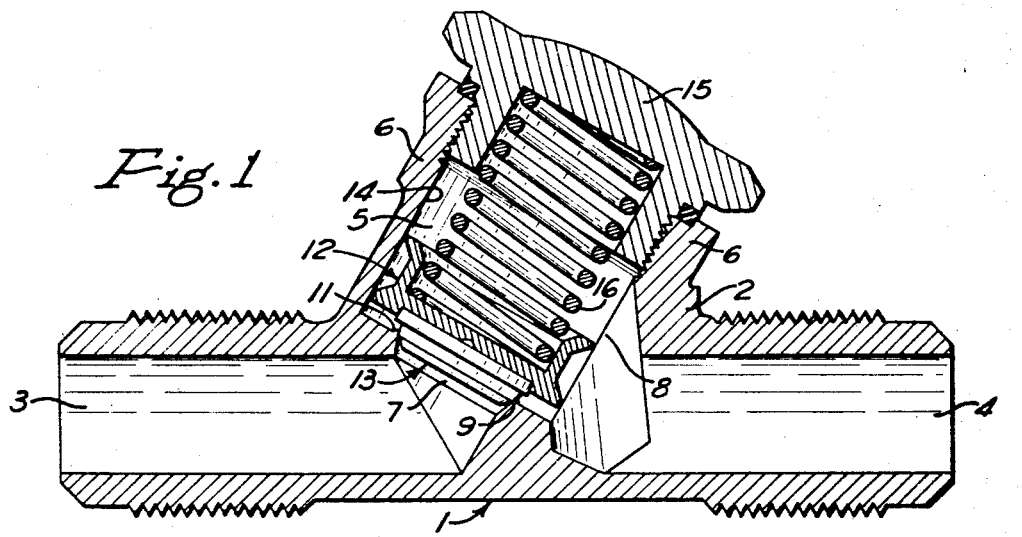
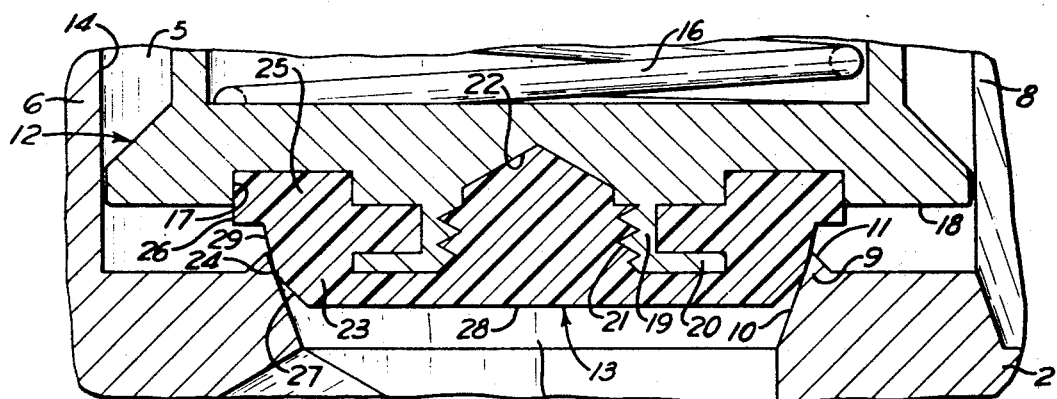
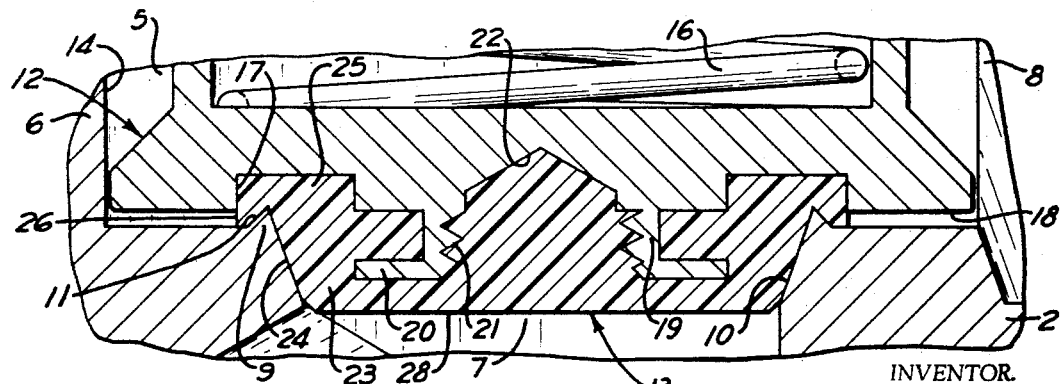
INVENTOR.
WILLIAM C. YOCUM
BY Webb, Machey & Burden
ATTORNEY.

United States Patent Office 3,438,391
Patented Apr. 15, 1969

3,438,391
CHECK VALVES HAVING PLASTIC
SEALING MEMBER
William C. Yocum, Mount Lebanon, Pa., assignor to
Superior Valve & Fittings Co., Pittsburgh, Pa., a corporation of Pennsylvania
Filed Jan. 13, 1964, Ser. No. 337,350
Int. Cl. F16k 15/00, 17/00, 21/04
U.S. Cl. 137—516.29                              10 Claims This invention relates to check valves, and more particularly to body seats and seats disks of check valves which are closed when the seat disk engages the body seat and are open when the seat disk is out of engagement with the body seat.

Check valves regulate flow of a fluid, such as a gas or liquid, through a pipe, conduit, line, etc., in one direction only and have wide application in refrigeration systems. One common use for such a valve is in a refrigeration system which includes two evaporators in combination with a single condenser unit. In such a refrigeration system, a check valve is in the line which runs between the lower temperature evaporator and the higher temperature evaporator. The check valve prevents flow of gas from the higher temperature evaporator where it is at a higher pressure into the lower temperature evaporator. Other units or systems which require check valves are hot gas defrost units and reverse cycle units.

Heretofore, many check valves have used a seat insert which moved into and out of engagement with the top of a raised metal body seat for closing and opening the valve. These seat inserts have been made of nylon and, in some cases, synthetic rubber, and have been mounted upon a movable insert holder or valve head by a rivet. It is this movable insert holder or valve head which travels into and out of engagement with the body seat to effect closing and opening of the valve. As a result of the rivet mounting of the seat insert, same warps and frequently irregularly warps so that substantial difficulty is encountered to produce a full or complete shut-off and closing of the valve. With a warped seat insert, substantial back pressure, such as 25 p.s.i., is sometimes required to flatten out the warped insert and obtain a complete shut-off.

My check valve avoids the problems of a warped seat insert and effects a complete shut-off with pressures below 5 p.s.i. Specifically, my invention resides in a check valve which has a body, an inlet and an outlet and a chamber interposed between and interconnecting the inlet and the outlet. This inlet has an opening into the chamber. The invention comprises a body seat in the chamber between the inlet and the outlet, which body seat comprises a surface formed by the body and extending completely around the opening of the inlet into the chamber. This body seat surface is disposed to flare outwardly from the inlet towards the chamber at an angle such that a line substantially parallel to the body seat surface intersects the central axis of the inlet opening at an acute angle of substantially about 15°–30°. The body seat surface extends to a ridge which runs completely around the inlet opening and is located in the chamber. A seat disk mounted by a disk holder is movable in the chamber and travels into and out of engagement with the body seat in closing and opening the valve. This seat disk has a first portion which when the valve is closed extends into the inlet opening and engages at least a portion of the body seat surface completely therearound. The seat disk also has a second portion which overhangs the ridge completely therearound and is adapted to engage this ridge when the valve is closed.

The seat disk is molded to the disk holder and is made from a material which has a hardness from substantially about Rockwell R10–R125 as determined by ASTM D785 test, and which deforms under loads substantially about 1%–30% as determined by ASTM D621 test carried out at 122° F., 2000 p.s.i., for 24 hours. Additionally, the material has a coefficient of friction of substantially about 0.07–0.40 between it and a polished steel.

The surface of the first portion of the seat disk which extends into and engages the body seat surface is machined.

In the accompanying drawings, I have shown a preferred embodiment of my invention, in which:

FIGURE 1 is a vertical section view of a check valve which has my invention;

FIGURE 2 is an enlarged fragmentary section view of the body seat, seat disk and disk holder of the check valve of FIGURE 1; and FIGURE 3 is a view similar to FIGURE 2 which shows the body seat, seat disk and disk holder after 10,000 openings and closings of the valve of FIGURE 1.

Referring to FIGURES 1–3, a check valve 1 comprises a body 2 which defines an inlet 3 and an outlet 4. Interposed between and interconnecting the inlet and outlet is a chamber 5 formed in part by upwardly inclining walls 6 of the body 2. The inlet has an opening 7 into the chamber 5 and the outlet also has an opening 8 into this chamber. Preferably, the body 2 is made from a metal such as brass, steel, cast iron, etc.

Disposed in the chamber between the inlet and the outlet is a body seat 9 at the opening 7 of the inlet 3 into the chamber 5. This body seat extends completely around the opening 7 and comprises a surface 10 which is formed by the body 2, which flares outwardly from the inlet towards the chamber 5 and which is disposed at an angle such that a line substantially parallel to the surface 10 intersects the central axis of the inlet opening at an acute angle of 20°. This angle may also fall into a range of substantially about 15°–30°.

The body seat surface 10 extends to a ridge 11 which is a part of the body seat 9 and which runs completely around the inlet opening 7 and is positioned inside the chamber 5.

Mounted upon a disk holder 12 is a seat disk 13 which moves in the chamber 5 into engagement with the body seat 9 for closing the valve and travels out of engagement with the body seat 9 when the valve opens. Interior walls 14 of the body 2 which incline upwardly guide the disk holder 12 in its travel within the chamber. As shown in FIGURE 1, at the outer ends of the upwardly inclining walls 6 of the body 2 is a cap 15 which seats one end of a coil spring 16 whose other end is seated by the disk holder 12 so that in normal operation of the valve, the seat disk 13 is continually urged towards and into engagement with the body seat 9.

This seat disk is made from a material which has a hardness of substantially about Rockwell R10–R125 as determined by an ASTM test D785. Also, the material has cold flow properties which are ascertained by the amount it deforms under load. Preferably, the deformation under load of the material is substantially about 1%–30%, as determined by ASTM test D621, carried out at 122° F., under a load of 2000 p.s.i., for 24 hours. Additionally, the material has lubricity properties such that it does not easily stick upon the body seat. The lubricity property is a coefficient of friction which, as determined between the material and polished steel is 0.07–0.40. Examples of materials used for the seat disk include: tetrafluoroethylene (Teflon), trifluorochloroethylene (Kel F), polyamide resins (nylon), of which the tetrafluoroethylene and trifluorochloroethylene are preferred. The tetrafluoroethylene and trifluorochloroethylene have particularly good lubricity properties which render them attractive for use as seat disks and substantially reduce, if not eliminate, tendency of the seat disk to stick in the body seal. Accordingly, my valve readily and reliably opens at that pressure of fluid for which it is designed.

The seat disk 13 is molded to the disk holder 12 in a cavity 17 located on the leading face 18 of the disk holder 12 and is maintained securely affixed thereto by a depending ring 19 which extends from the leading face 18 of the disk holder 12 and then makes a right-angle turn to form the undercut portions 20. Additionally, threaded portions 21 in a well 22 at the center of the cavity 17 assist to securely mount the seat disk 13 to the holder 12. As shown, the depending ring and the threaded portion are completely embedded in the seat disk.

Referring to FIGURE 2, the seat disk 13 has a first portion 23 which when the valve is closed, as shown, extends into the inlet opening 7 and the exterior surface 24 of this first portion then engages a portion of the body seat surface 10 completely therearound to effect a shut-off of the valve. Such engagement of the first portion 23 of the seat disk 13 with the body seat surface 10 forms the primary seal or shut-off of this valve. The seat disk has a second portion 25 integral with the first portion 23 and comprising an outwardly laterally disposed lip 26 which runs completely therearound and overhangs the ridge 11 of the body seat 9.

FIGURE 2 shows the seat disk as it is furnished to a user and before it has been placed in service. That exterior surface 24 of the first portion 23 has two outwardly flaring parts, a first one 27 which extends from the leading face 28 of the seat disk towards the lip 26, and which is disposed at an angle of 45° to the central axis of the opening. The second part 29 of this exterior surface 24 is connected to the first one, runs to the lip 26, and is disposed at an angle less than that of the body seat surface and, as shown, at one of 15° to the central axis of the opening 7. To insure perfect concentricity and to eliminate irregularities which may be formed in the molding process, both the first and second parts 27 and 29 of the exterior surface 24 are machined.

The combination of the molding operation for effecting mounting of the seat disk 13 upon the disk holder 12, and of the machining of the exterior surfaces 27 and 29 of the seat disk, avoid any warpage in the seat disk and assure excellent concentricity to provide easy and complete shut-offs of the valve.

After the valve has been opened and closed a few times in service, the exterior surface 24 of the seat disk 13 becomes more compatible with the body seat surface 9 to impart good shut-off characteristics to the valve, for example, reliable shut-offs at pressures below 5 p.s.i. Such compatibility results from the cold flow properties of the material from which this seat disk is made. Usually, cold flow properties are unwanted for valve seats, but my invention utilizes same to advantage.

FIGURE 3 shows the disk seat of FIGURE 2 after 10,000 shut-offs, which have altered the shape and size of the two parts 27 and 29, and greatly increased the contact area between the body seat surface 9 and the exterior surface 24 of the seat disk. Again, this is due to the cold flow properties of the material from which the seat disk is made. The increased contact area has certain disadvantages from the standpoint that there is more tendency for entrapment of foreign particles therein with resultant defective or incomplete shut-offs. However, as shown in FIGURE 3, the ridge 11 becomes embedded in the overhanging lip 26 of the disk seat after 10,000 shut-offs to form a secondary seal. Accordingly, even though a foreign particle may become lodged in the contact area, a complete shut-off is effected between the ridge 11 and the overhanging lip 26.

After 600,000 shut-offs, there is very little change in the disk seat and in the contact area between the body seat surface 9 and the seat disk 13 from that shown in FIGURE 3.

My invention has important features which render it especially advantageous. In the first place, molding the seat disk to the disk holder avoids warpage of the disk seat and effects easier, complete shut-offs.

In the second place, the machined exterior surfaces of the seat disk also effect easy, complete shut-offs.

In the third place, the cold flow properties of the material from which the seat disk is made cooperate to achieve good compatibility between the seat disk and the body seat, and both a primary seal and a secondary seal after usage.

In the fourth place, the lubricity property of some of the materials from which the seat disk is made substantially reduce, if not eliminate, tendency for the seat disk to stick in the body seat.

I claim:

1. In a check valve having a metal body, an inlet and an outlet and a chamber interposed between and interconnecting said inlet and said outlet, said inlet having an opening into said chamber, the invention comprising a body seat in said chamber between said inlet and said outlet, said body seat comprising a surface formed by said body and extending completely around said opening of said inlet into said chamber, said body seat surface flaring outwardly from said inlet towards said chamber and being disposed at an angle such that a line substantially parallel to said surface intersects the central axis of said inlet opening at an acute angle of substantially about 15°–30°, said body seat surface extending to a protruding ridge which runs completely around said inlet opening and is disposed in said chamber, a seat disk mounted by a metal disk holder which is axially movable in said chamber so that said seat disk travels into and out of engagement with said body seat in closing and opening said valve, said seat disk having a first portion which, when said valve is closed, extends into said inlet opening and engages at least a portion of said body seat surface completely therearound, said seat disk having a second portion which overhangs said ridge completely therearound and into which the ridge becomes embedded when said valve is closed, at least said first and second portions of said seat disk being wholly made from a plastic material having cold flow properties including a hardness from substantially about Rockwell R10–R125 as determined by ASTM D785, and a deformation under load substantially about 1%–30% as determined by ASTM D621 test carried out at 122° F. 2000 p.s.i., for 24 hours, the seat disk and body seat surface being constructed and arranged so that the seal is made between those portions of the seat disk made from the material having cold flow properties and the body seat and metal-to-metal contact between the seat disk and disk holder on the one hand and the body seat on the other hand is avoided.

2. The invention of claim 1 characterized by said material having a coefficient of friction of substantially about 0.07–0.40 as determined between it and polished steel.

3. The invention of claim 1 characterized by that surface of said first portion of said seat disk which extends into and engages said body seat surface being machined.

4. The invention of claim 1 characterized by said disk holder including at least one member at least a portion of which is embedded in said seat disk and is disposed angularly to the axis of travel of said disk holder.

5. The invention of claim 1 characterized by said material having a coefficient of friction of substantially about 0.07–0.40 as determined between it and polished steel, by that surface of said first portion of said seat disk which extends into and engages said body seat surface being machined, and by said disk holder including at least one member at least a portion of which is embedded in said seat disk and is disposed angularly to the axis of travel of said disk holder.

6. In a check valve having a metal body, an inlet and an outlet and a chamber interposed between and interconnecting said inlet and said outlet, said inlet having an opening into said chamber, the invention comprising a body seat in said chamber between said inlet and said outlet, said body seat comprising a surface formed by said body and extending completely around said opening of said inlet into said chamber, said body seat surface flaring outwardly from said inlet towards said chamber and being disposed at an angle such that a line substantially parallel to said surface intersects the central axis of said inlet opening at an acute angle of substantially about 15°–30°, said body seat surface extending to a protruding ridge which runs completely around said inlet opening and is disposed in said chamber, a seat disk mounted by a metal disk holder which is axially movable in said chamber so that said seat disk travels into and out of engagement with said body seat in closing and opening said valve, said seat disk having a first portion which, when said valve is closed, extends into said inlet opening and engages at least a portion of said body seat surface completely therearound, said seat disk having a second portion which overhangs said ridge completely therearound and into which the ridge becomes embedded when said valve is closed, at least said first and second portions of said seat disk being wholly made from a plastic material having cold flow properties selected from the group consisting of tetrafluoroethylene, trifluorochloroethylene and a polyamide resin, the seat disk and body seat surface being constructed and arranged so that the seal is made between those portions of the seat disk made from the material having cold flow properties and the body seat and metal-to-metal contact between the seat disk and disk holder on the one hand and the body seat on the other hand is avoided.

7. The invention of claim 6 characterized by said material having a coefficient of friction of substantially about 0.07–0.40 as determined between it and polished steel.

8. The invention of claim 6 characterized by that surface of said first portion of said seat disk which extends into and engages said body seat surface being machined.

9. The invention of claim 6 characterized by said disk holder including at least one member at least a portion of which is embedded in said seat disk and is disposed angularly to the axis of travel of said disk holder.

10. The invention of claim 6 characterized by said material having a coefficient of friction of substantially about 0.07–0.40 as determined between it and polished steel, by that surface of said first portion of said seat disk which extends into and engages said body seat surface being machined, and by said disk holder including at least one member at least a portion of which is embedded in said seat disk and is disposed angularly to the axis of travel of said disk holder.

References Cited

FOREIGN PATENTS 499,981    2/1939    Great Britain.

HAROLD W. WEAKLEY, *Primary Examiner.*

U.S. Cl. X.R.

137—536, 540; 251—368